(12) United States Patent
Carré et al.

(10) Patent No.: US 11,340,099 B2
(45) Date of Patent: May 24, 2022

(54) STATIC FLUID METER

(71) Applicant: Itron Global SARL, Liberty Lake, WA (US)

(72) Inventors: Patrice Carré, Ecully (FR); Herve Dury, Charnay les Macon (FR)

(73) Assignee: Itron Global SARL, Liberty Lake, WA (US)

( * ) Notice: Subject to any disclaimer, the term of this patent is extended or adjusted under 35 U.S.C. 154(b) by 128 days.

(21) Appl. No.: 16/831,682

(22) Filed: Mar. 26, 2020

(65) Prior Publication Data

US 2021/0302215 A1 Sep. 30, 2021

(51) Int. Cl.
*G01F 1/66* (2022.01)
*G01F 1/58* (2006.01)
*G01F 15/00* (2006.01)

(52) U.S. Cl.
CPC ................. *G01F 1/66* (2013.01); *G01F 1/58* (2013.01); *G01F 15/00* (2013.01)

(58) Field of Classification Search
CPC ... G01F 15/00; G01F 1/58; G01F 1/66; G06F 7/58; G06F 7/588; H03K 3/84
See application file for complete search history.

(56) References Cited

U.S. PATENT DOCUMENTS

| 4,987,877 A | 1/1991 | Nakaniwa | |
|---|---|---|---|
| 6,065,351 A * | 5/2000 | Nagaoka | G01F 1/66 |
| | | | 73/861.28 |
| 2014/0345391 A1* | 11/2014 | Watanabe | G01F 1/72 |
| | | | 73/861.29 |

FOREIGN PATENT DOCUMENTS

| EP | 2808657 A1 | 12/2014 |
|---|---|---|
| JP | 11258018 A | 9/1999 |

OTHER PUBLICATIONS

The Extended European Search Report dated Jul. 28, 2021 for European Patent Application No. 21165081.7, 8 pages.

\* cited by examiner

*Primary Examiner* — Benjamin R Schmitt
(74) *Attorney, Agent, or Firm* — Lee & Hayes, P.C.

(57) ABSTRACT

Techniques for operating a static fluid meter are described herein. In an example, a sampling interval is identified. The sampling interval is a period of time within which an electromagnetic or acoustic device measures or samples a rate of the fluid flow. The sampling interval may be approximately 1 second long; however, the interval may be longer or shorter depending on the design requirements of a particular system. A random number is generated and/or received. A sampling time within the sampling interval may be determined based at least in part on the random number. By sampling at a different and randomly determined location within each of a series of sampling intervals a more accurate fluid measurement may be obtained.

23 Claims, 11 Drawing Sheets

1000

906
DETERMINE A SAMPLING TIME WITHIN THE SAMPLING INTERVAL BASED AT LEAST IN PART ON THE RANDOM NUMBER

1002
DETERMINE THE SAMPLING TIME BY ADDING OR SUBTRACTING TIME FROM A STARTING TIME OF THE SAMPLING INTERVAL, AN ENDING TIME OF THE SAMPLING INTERVAL, OR AN INTERMEDIATE POINT OF THE SAMPLING INTERVAL

1004
DETERMINE THE SAMPLING TIME ACCORDING TO A UNIFORM DISTRIBUTION (OR OTHER DISTRIBUTION, SUCH AS NORMAL DISTRIBUTION)

1006
DETERMINE THE SAMPLING TIME ACCORDING TO A DISTRIBUTION WITHIN A PORTION OF THE SAMPLING INTERVAL, WHEREIN THE PORTION OF THE SAMPLING INTERVAL IS LESS THAN THE SAMPLING INTERVAL

1008
IN AN EXAMPLE, A SIZE OF THE PORTION OF THE SAMPLING INTERVAL IS SET BASED AT LEAST IN PART ON AT LEAST ONE OF A MAGNITUDE OF MEASURED FLUID FLOW AND/OR A VARIABILITY OF MEASURED FLUID FLOW

FIG. 10

STATIC FLUID METER

BACKGROUND

The flow of fluid (e.g., water, natural gas, etc.) may be measured by a static fluid metering device. Such metering devices have no moving parts and are therefore considered to be "static." Instead of moving parts, electromagnetic or ultrasonic technologies are used. In some applications, static fluid meters may measure lower flowrates than is possible with older technologies that require the fluid flow to exceed a threshold value associated with the friction of moving parts.

Unfortunately, many static meters must balance the need for accuracy with the need to provide long battery life. Water and natural gas meters often are not mains-powered, and a product-requirement specification for such meters may require a 20-year battery life. Accordingly, such meters must balance a faster sampling rate (for better accuracy) with a slower sampling rate (for better battery longevity).

Since both goals are important, technologies that would benefit both goals would be welcome.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 10 is a flowchart showing example techniques by which a sampling time may be determined.

DETAILED DESCRIPTION

Figure 1:
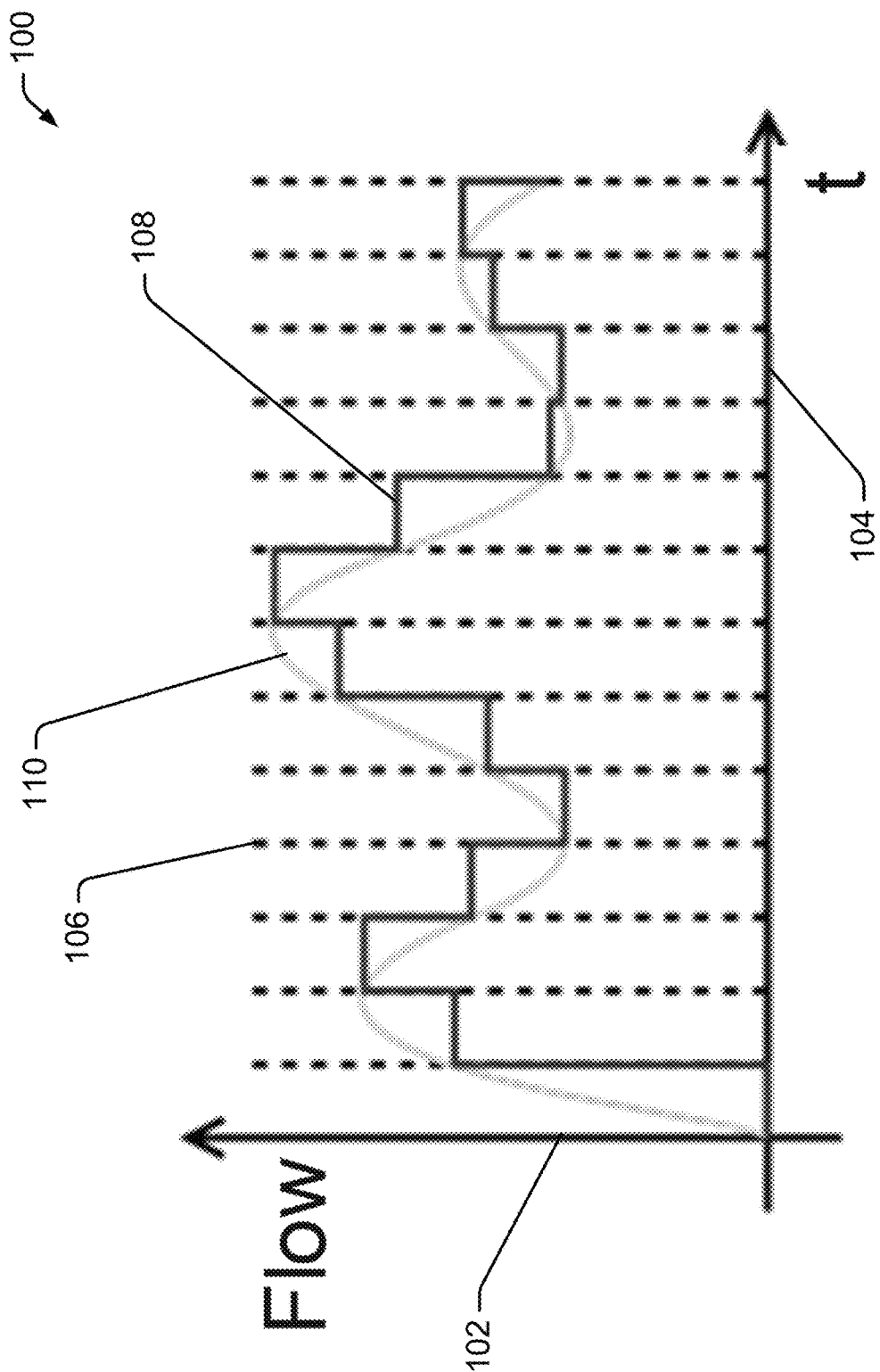
FIG. 1 is a diagram of an example relationship of fluid flowrate over time, which is measured by static fluid meter(s) disclosed herein.

FIG. 1 shows an example relationship 100 of flowrate over time. In the example, the flowrate is recorded by the vertical flowrate axis 102, and time is recorded by the horizontal time axis 104. The times at which the flowrate was measured (i.e., "sampled") are shown by the dashed vertical lines 106. Accordingly, each dashed vertical line 106 represents a position within one sampling interval or sampling period (e.g., the start, middle or end of the interval). In an example, each vertical line represents the end of one sampling interval and the start of the next sampling interval. Alternatively, each dashed vertical line 106 may represent the middle or other location of a sampling interval. The quantity of fluid in each sampling interval may be calculated as the multiplicative product of the measured flowrate and the period of time in the sampling interval.

In one example, a quantity of fluid may be approximated by the area under the step-function "curve" 108. In each sampling interval (between adjacent dashed vertical lines) a flowrate and time period (i.e., the length of the sampling interval) may be used to determine overall fluid measured.

In a second example, a quantity of fluid may be approximated by the area under the curve 110. The curve 110 may be configured as a best-fit for the flowrate samples and/or step-function curve 108 based on known techniques.

Figure 2:
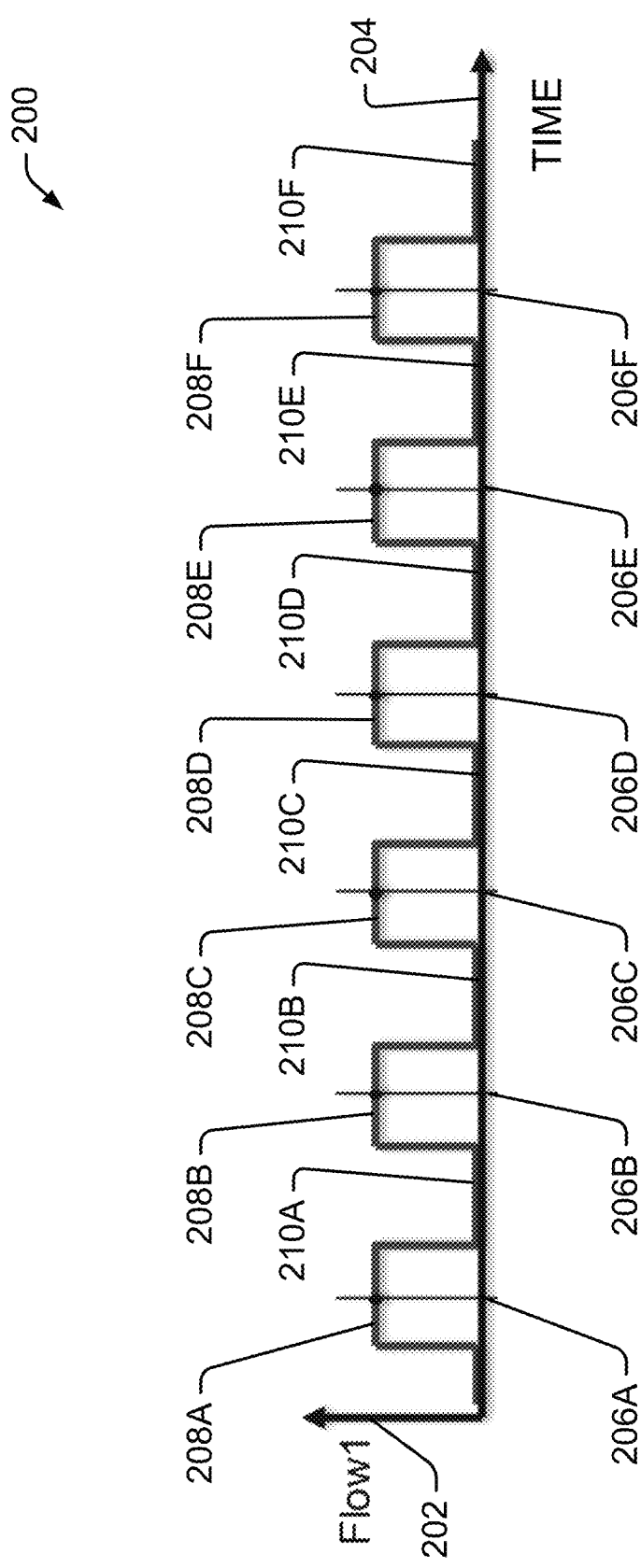
FIG. 2 is a diagram showing a first example of flowrate over time, which may be mishandled by known static metering devices, but which is advantageously handled using devices and/or techniques described herein.

FIG. 2 shows a first example relationship 200 of flowrate over time which may be mishandled by known static metering devices. In the example, flowrate is shown by the vertical flowrate axis 202 and time is shown by the horizontal time axis 204. A plurality of times at which samples (i.e., flowrate measurements) 206A-206F are taken are distributed uniformly in time.

The incoming fluid flow is a square wave, which may result from a gas meter test, a gas appliance, water appliance, impulse lawn sprinkler, etc., that has regular changes in fluid consumption. In the example, higher flowrates 208A-208F alternate with lower flowrates 210A-210F in a regular and periodic manner. Because the time 206A-206F of the sample or flowrate measurement coincides with respective higher flowrates 208A-208F, the summation of the fluid flow indicates that the fluid consumption is higher than (e.g., twice) the actual consumption. That is, since the measurements (i.e., samples) were taken at the high-usage times 208A-208F and not the low-usage times 210A-210F, the fluid consumption is overstated by the fluid measurements.

Figure 3:
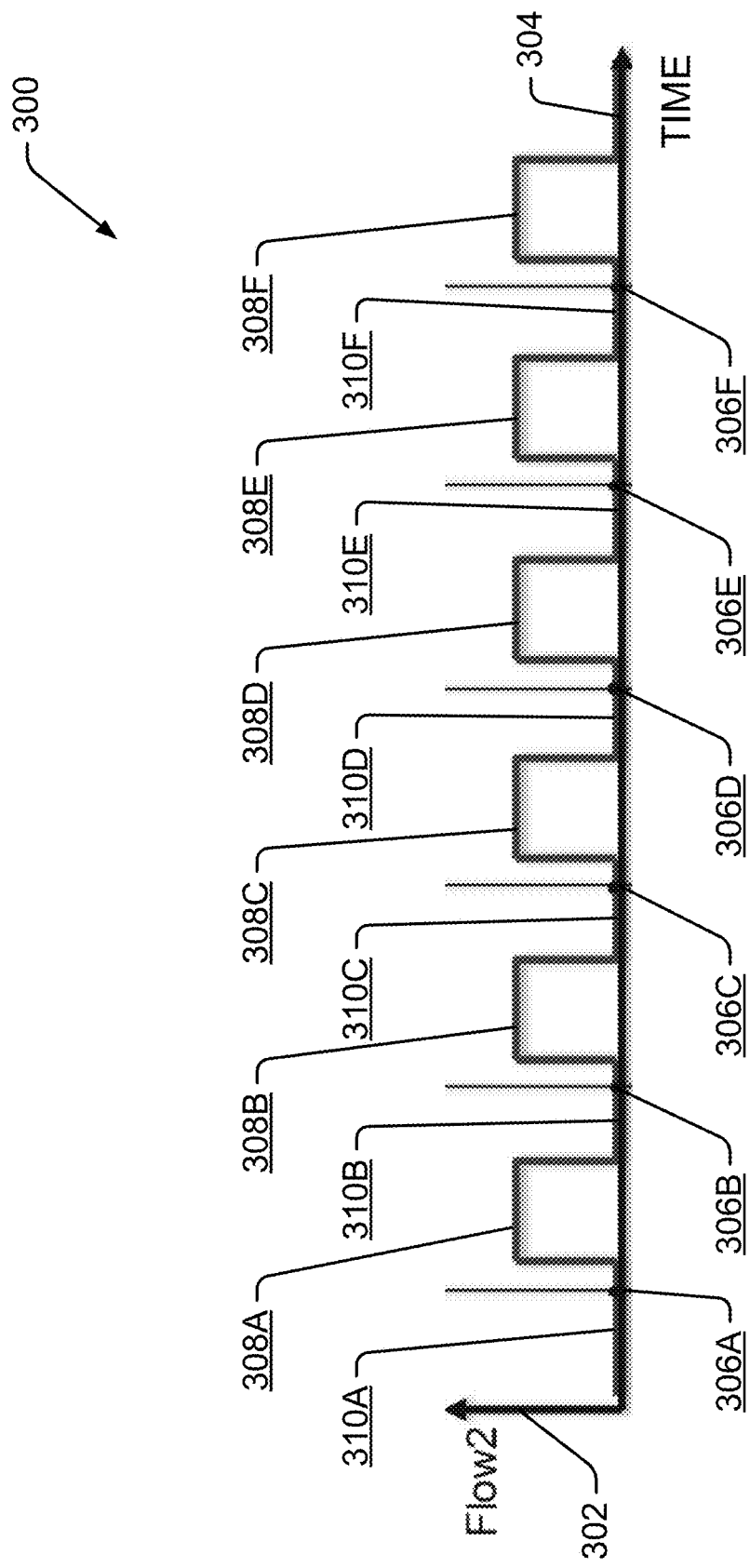
FIG. 3 is a diagram showing a second example of flowrate over time, which may be mishandled by known static metering devices, but which is advantageously handled using devices and/or techniques described herein.

FIG. 3 shows a second example relationship 300 of flowrate over time which may be mishandled by known static metering devices. In the example, flowrate is shown by the vertical flowrate axis 302 and time is shown by the horizontal time axis 304. A plurality of times—at which samples (i.e. flowrate measurements) 306A-306F are taken—are distributed uniformly in time.

The incoming fluid flow is a square wave, which may result from a gas meter test, a gas appliance, water appliance, impulse lawn sprinkler, etc., that has regular changes in fluid consumption. In the example, higher flowrates 308A-308F alternate with lower flowrates 310A-310F in a regular and periodic manner. Because the time 306A-306F of the sample or flowrate measurement coincides with respective lower flowrates 310A-310F (the opposite situation of FIG. 2), the summation of the fluid flow indicates that the fluid consumption is zero. That is, since the measurements (i.e., samples) were taken at the low-usage times 310A-310F and not the high-usage times 308A-308F, the fluid consumption is understated by the fluid measurements.

OVERVIEW

The disclosure describes techniques for providing a better balance between battery power usage and metering accuracy than is possible with currently known static fluid metering devices. With known static fluid measuring devices (e.g., devices configured to measure water, hot water, steam, natural gas, etc.) a higher sampling rate results in greater measurement accuracy. A lower sampling rate results in longer battery life. Additionally, known metering devices are poorly adapted to periodic changes in fluid flow, which may result from test fluid-flows used in meter-testing, certain leaks, impulse water-sprinklers, non-laminar fluid flows, and/or other causes and conditions.

In an example of the techniques, a sampling interval is determined. The sampling interval is a period of time within which an electromagnetic or acoustic metrology device measures or samples a rate of the fluid flow. The sampling interval may be approximately 1 or 2 seconds long. However, the interval may be longer or shorter depending on the design requirements of a particular system. If the sampling interval is sized to include one sampling event, then the duration of the sampling interval may indicate battery-power consumption over time.

A random number is generated, sent and/or received. A sampling time within the sampling interval may be determined based at least in part on the random number. In an example of such random numbers, the sampling time may be 39% of the way through a first interval, 71% of the way through a second interval, 28% of the way through a third interval, etc. Accordingly, samples will be taken in a manner that avoids the problems described with respect to FIGS. 2 and 3.

In some examples, a location of the sampling time within a sampling interval may be constrained to be within a subset of that interval (e.g., constrained to be within the middle half of the sampling interval). If the sampling time is determined randomly and constrained to be within the middle 50% of the interval, then two sampling times will not be selected to be closer than 50% of a duration of the interval or separated by more than 150% of a duration of the interval.

In other examples, a default time (i.e., a time that is within a sampling interval) may be set. In the example, the default sampling time may be assumed to be at some point within the sampling interval, such as at the beginning or center of the interval, etc. A random number is received or generated. The default sampling time is then adjusted to a different time within the sampling interval, based at least in part on the random number. Accordingly, an adjusted sampling time (within the sampling interval) is determined and/or calculated based at least in part on the random number. The fluid flow is then sampled at the adjusted sampling time.

Example System and Techniques

Figure 4:
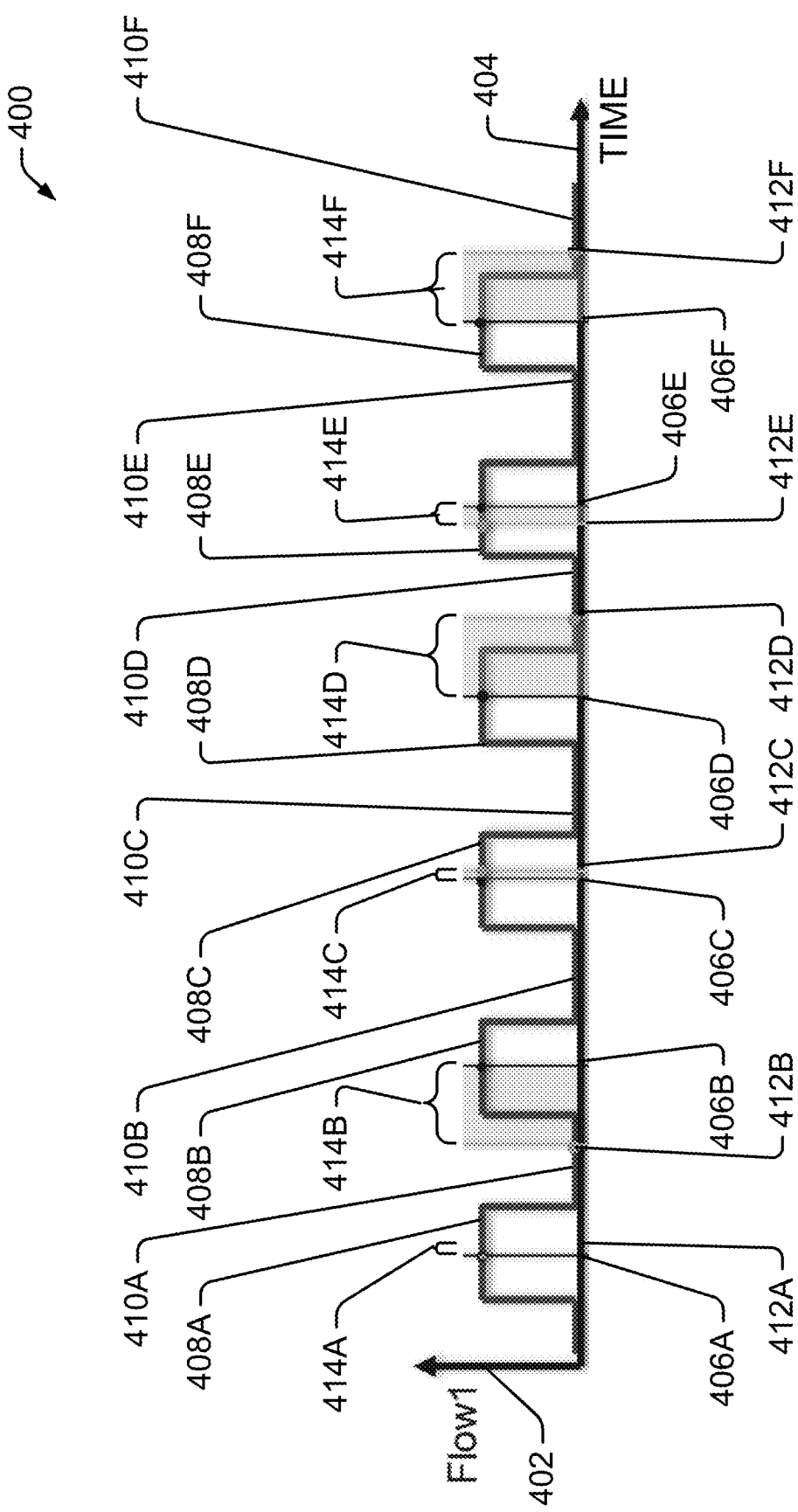
FIG. 4 is a diagram showing how the first example of flowrate is correctly processed by static fluid meter(s) and/or techniques disclosed herein.

FIG. 4 shows an example relationship 400 of flowrate that is measured over time using static fluid meter(s) and techniques disclosed herein. In the example, flowrate is shown by the vertical flowrate axis 402 and time is shown by the horizontal time axis 404. A plurality of pre-adjustment sample times 406A-406F are distributed uniformly in time, such as within respective sampling intervals of equal duration. In examples, the pre-adjustment sample times 406A-406F may be located at the beginning, center, end, or other location of each sampling interval.

In a manner similar to that seen in FIG. 2, the incoming fluid flow in the example 400 is a square wave. In the example, higher flowrates 408A-408F alternate with lower (e.g., zero) flowrates 410A-410F in a regular and periodic manner. The pre-adjustment sample times 406A-406F of the sample or flowrate measurement coincide with respective higher flowrates 408A-408F (in a manner similar to the example of FIG. 2).

The pre-adjustment sample times 406A-406F are adjusted by respective adjustment times 414A-414F, to become actual sample times, i.e., the times samples are actually taken 412A-412F. The adjustment times 414A-414F associated with respective pre-adjustment sample times 406A-406F may be based on a random number. The adjustment times 414A-414F may be positive or negative, and when added to pre-adjustment sample times 406A-406F result in actual sample times 412A-412F. The adjustment times may be of a magnitude that is sufficient to locate the actual sample times anywhere in a respective sampling interval. Alternatively, the adjustment times may be of a magnitude that is sufficient to locate the actual sample times within only a portion of the sampling interval, which would provide a control or limit on how much or little time can elapse between adjacent actual sample times. The adjustment times 414A-414F may also be considered and/or referred to as an offset time or a delta-time.

Unlike the example of FIG. 2, the sample is taken at a time determined by addition of randomly-generated adjustment time 414A-414F to each of the pre-adjustment sample times 406A-406F, respectively. As a result of the addition of the (positive or negative) adjustment time, actual sample times 412A-412F are obtained. The samples obtained at the actual sample times 412A-412F (as opposed to the pre-adjustment times 406A-406F) include a mixture of higher flow rates 408A, 408C and 408E and lower flow rates 410B, 410D and 410F. When summed together, the mixture of higher flow rates and lower flow rates results in a more accurate measurement of the in-coming flow than resulted in the example 200 of FIG. 2.

Figure 5:
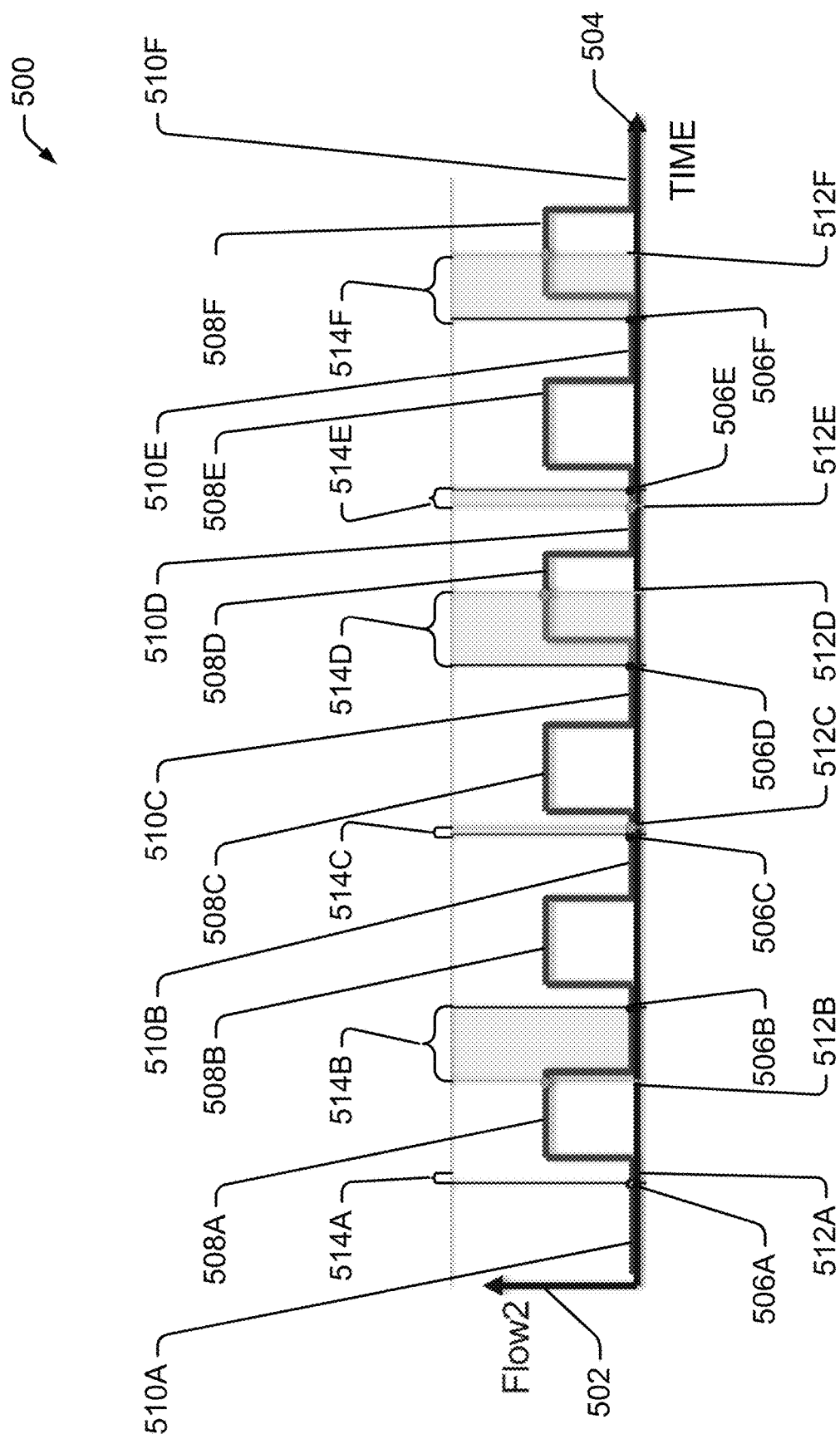
FIG. 5 is a diagram showing how the second example flowrate is correctly processed by static fluid meter(s) and/or techniques disclosed herein.

FIG. 5 shows an example relationship 500 of flowrate that is measured over time using static fluid meter(s) and techniques disclosed herein. In the example, flowrate is shown by the vertical axis 502 and time is shown by the horizontal axis 504. A plurality of pre-adjustment sample times 506A-506F are distributed uniformly in time, such as within respective sampling intervals of equal duration. In examples, the pre-adjustment sample times 506A-506F may be located at the beginning, center, end, or other location of each sampling interval.

In a manner similar to that seen in FIG. 3, the incoming fluid flow in the example 500 is a square wave. In the example, higher flowrates 508A-508F alternate with lower (e.g., zero) flowrates 510A-510F in a regular and periodic manner. The pre-adjustment sample time 506A-506F of the sample or flowrate measurement coincides with respective higher flowrates 508A-508F (in a manner similar to the example of FIG. 3).

The pre-adjustment sample times 506A-506F are adjusted by respective adjustment times 514A-514F, to become actual sample times, i.e., the times samples are actually taken 512A-512F. The adjustment times 514A-514F associated with respective pre-adjustment sample times 506A-506F may be based on a random number. The adjustment times 514A-514F may be positive or negative, and when added to pre-adjustment sample times 506A-506F result in actual sample times 512A-512F. The adjustment times may be of a magnitude that is sufficient to locate the actual sample times anywhere in a respective sampling interval. Alternatively, the adjustment times may be of a magnitude that is sufficient to locate the actual sample times within only a portion of the sampling interval, which would provide a control or limit on how much or little time can elapse between adjacent actual sample times. The adjustment times 514A-514F may also be considered and/or referred to as an offset time or a delta-time.

Unlike the example of FIG. 3, the sample is taken at a time determined by addition of a randomly-generated adjustment time 514A-514F to each of the pre-adjustment sample times 506A-506F, respectively. As a result of the addition of the (positive or negative) adjustment time, actual sample times 512A-512F are obtained. The samples obtained at the actual sample times 514A-514F (as opposed to the pre-adjustment times 506A-506F) include a mixture of higher flow rates 508B, 508D and 508F and lower flow rates 510A, 510C and 510E. When summed together, the mixture of higher flow rates and lower flow rates results in a more accurate measurement of the in-coming flow than resulted in the example 300 of FIG. 3.

Figure 6:
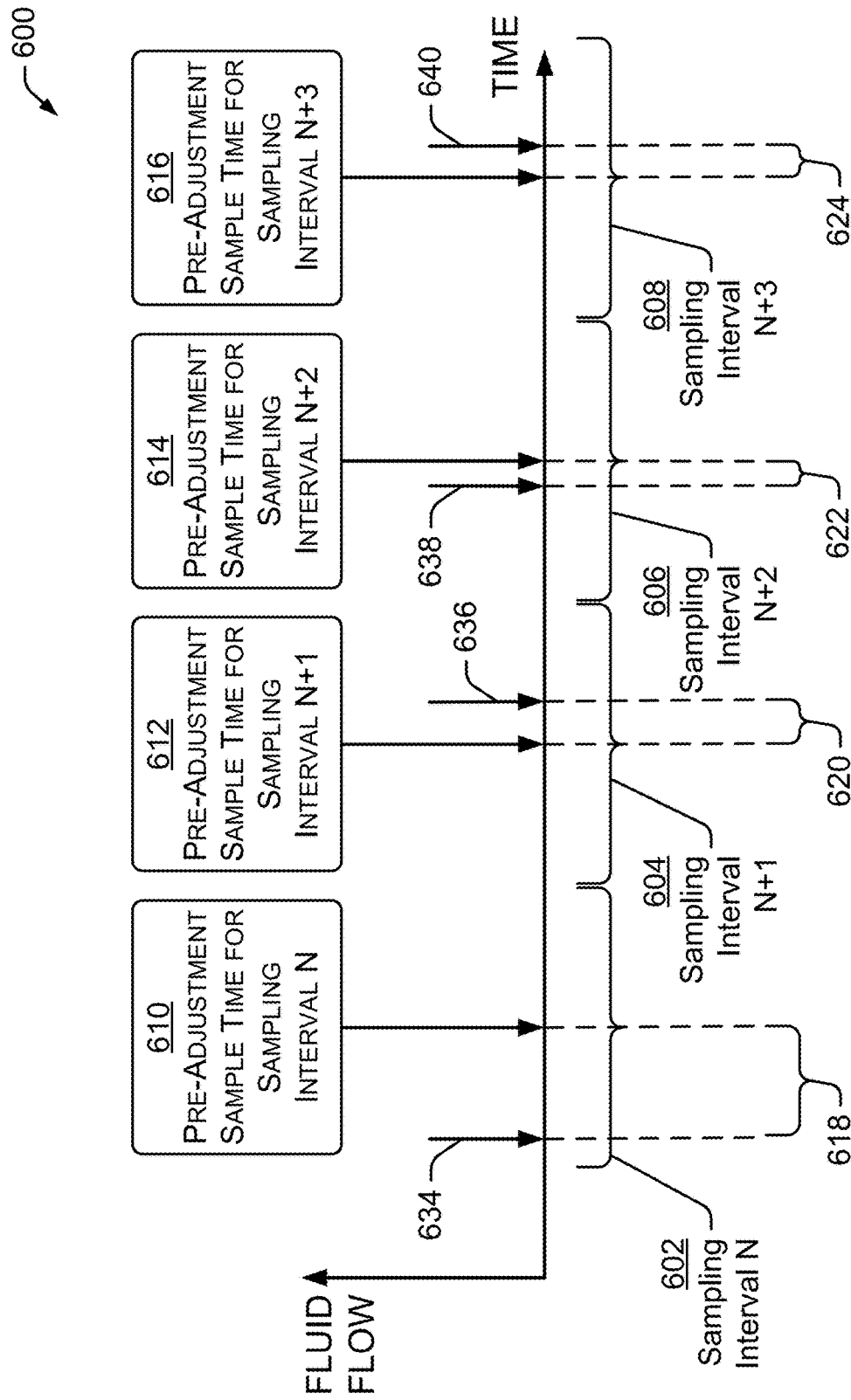
FIG. 6 is a diagram showing example techniques that improve data collection accuracy and power requirements.

FIG. 6 shows example techniques 600 that improve data collection accuracy. In the example, flowrate of a fluid is measured over time. A plurality of example sampling intervals 602-608 are shown. In the example, each sampling interval 602-608 may have a respective pre-adjustment sample time 610-616. As seen in FIGS. 2 and 3, pre-adjustment sampling times 206A-206F and 306A-306F may result in incorrect fluid measurement in some examples.

Each pre-adjustment sample time 610-616 may be adjusted earlier in time by a duration of up to (but typically not including) half the sampling interval 602-608. Alternatively, each pre-adjustment sample time 610-616 may be adjusted later in time by a duration of up to (but typically not including) half the sampling interval. Looked at differently, the pre-adjustment sample time 610-616 may be adjusted to any location within the sampling interval 602-608 (but typically not including the start or end of that period). Thus, the actual sample times 634-640 may be located (e.g., by operation of a random variable) at any location within the sampling intervals, typically exclusive of the start and endpoints of the interval.

As an example, the pre-adjustment sample time 610 has been adjusted to a location within the sampling interval that is a random percentage (e.g., as obtained by a random number generator) from the beginning (or other location) of the sampling interval. The result of the adjustment is the actual sample time 634, when the fluid flow is sampled (i.e., measured).

In the example of FIG. 6, a random number of −0.40 indicates that the shift 618 moves the pre-adjustment sample time 610 by 40% of the distance to the left (earlier in time) and resets the sample time at location 634. In a second example, a random number of 0.15 may indicate that the shift 620 moves the pre-adjustment sample time 612 by 15% of the distance to the right (later in time) and resets the sample time at location 636. In a third example, a random number of −0.10 may indicate that the shift 622 moves the pre-adjustment sample time 614 by 10% of the distance to the left (earlier in time) and resets the sample time at location 638. In a fourth example, a random number of 0.12 may indicate that the shift 624 moves the pre-adjustment sample time 616 by 12% of the distance to the right (later in time) and resets the sample time at location 640.

FIG. 6 also shows how actual sample times 634-640 may be calculated without reference to, or use of, any pre-adjustment sample times 610-616, and/or without reference to, or use of, the shifts in time 618-624. In an example, a random number of 0.10 results in an actual sample time 634 is located 10% into the sampling interval N. In a second example, a random number of 0.65 results in an actual sample time 636 that is located 65% into the sampling interval N+1. In a third example, a random number of 0.40 results in an actual sample time 638 that is located 40% into the sampling interval N+2. In a fourth example, a random number of 0.62 results in an actual sample time 640 that is located 62% into the sampling interval N+3. As seen in the examples, the actual sample times 634-640 may be randomly and/or uniformly distributed over time.

Figure 7:
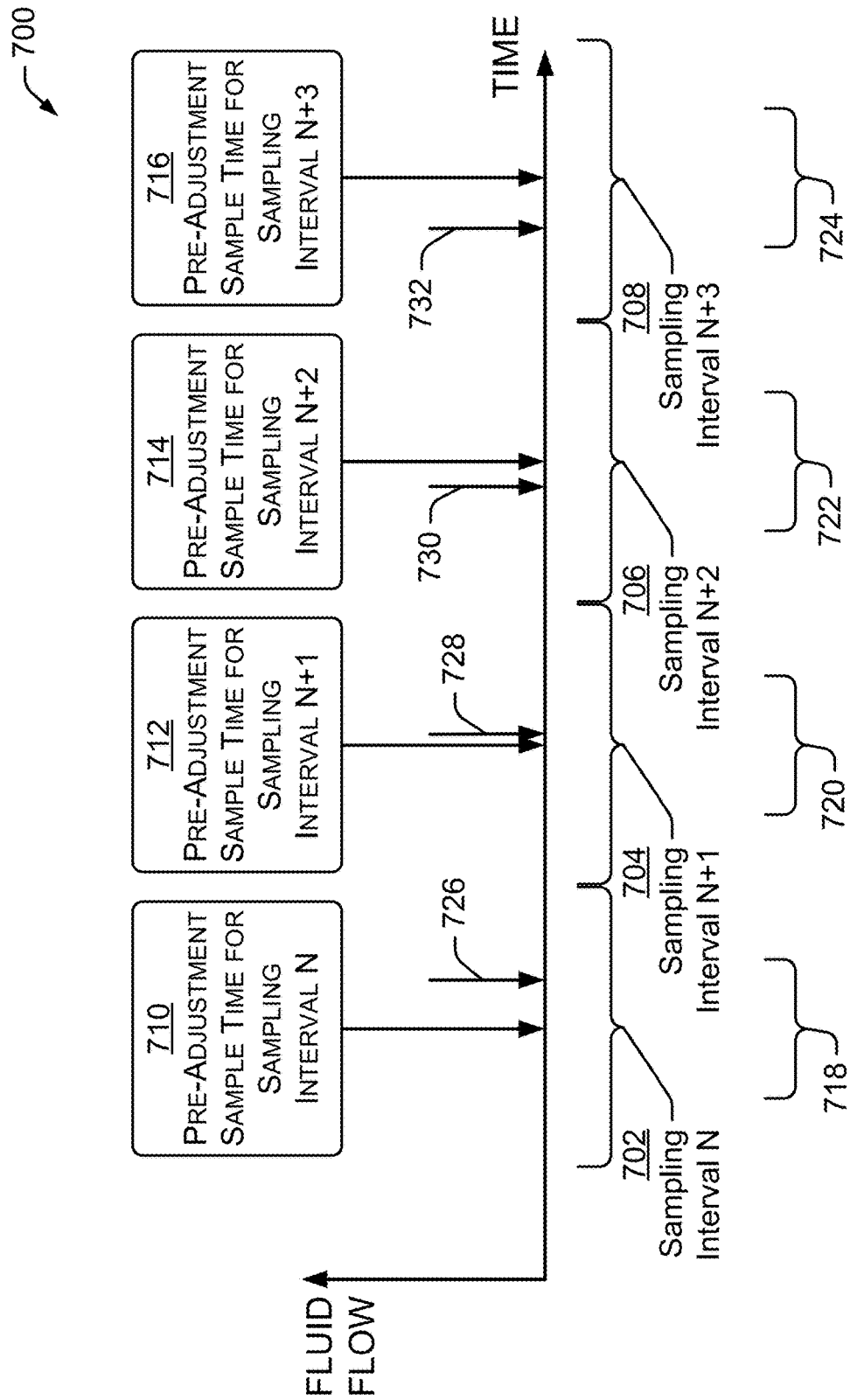
FIG. 7 is a diagram showing further example techniques that improve data collection accuracy and power requirements.

FIG. 7 shows example techniques 700 that improve data collection accuracy. The example is similar to the techniques 600 of FIG. 6. However, in the techniques 700, each pre-adjustment sample time 710-716 is adjusted by a random number acting on a respective allowed range 718-724 that is a subset of the time of the respective sampling interval 702-708. Accordingly, the allowed range is a defined subset of a respective sampling interval that includes the sampling time of that sampling interval. Thus, if the periods 718-724 are half the duration of the sampling intervals, then the actual sampling times 726-732 are prevented from getting within half the time of the sampling interval from each other. The allowed ranges 718-724 may be located in the center—or other portion—of respective sampling interval 702-708. This provides some of the benefits of variable sampling times without the detriment of a possibly overly long or overly short period between two samples (which could result, depending on the value of two random numbers in a sequence).

In the example of FIG. 7, a random number of 0.85 indicates that the pre-adjustment sample time 710 should be adjusted 85% into allowed range 718, which results in an actual sampling time of 726. In a second example, a random number of 0.55 indicates that the pre-adjustment sample time 712 should be adjusted 55% into allowed range 720, which results in an actual sampling time of 728. In a third example, a random number of 0.40 indicates that the pre-adjustment sample time 714 should be adjusted 40% into allowed range 722, which results in an actual sampling time of 730. In a fourth example, a random number of 0.25 indicates that the pre-adjustment sample time 716 should be adjusted to 25% into allowed range 724, which results in an actual sampling time of 732. Accordingly, distances between adjacent actual sampling times 726-732 are separated by at least a minimum distance, and no more than a maximum distance, that is based on the size of the allowed ranges 718-724 with respect to the sampling intervals 702-708. As seen in the examples, the actual sample times 726-732 may be randomly and/or uniformly distributed over time.

FIG. 7 also shows how actual sample times 726-732 may be calculated without reference to, or use of, any pre-adjustment sample times 710-716. In an example, a random number of 0.85 results in an actual sample time 726 that is located 85% into the allowed range 718 of the sampling interval N. In a second example, a random number of 0.55 results in an actual sample time 728 that is located 55% into the allowed range 720 of the sampling interval N+1. In a third example, a random number of 0.40 results in an actual sample time 730 that is located 40% into the allowed range 722 of the sampling interval N+2. In a fourth example, a random number of 0.25 results in an actual sample time 732 that is located 25% into the allowed range 724 of the sampling interval N+3.

Referring to FIG. 6 the distribution of actual sampling times 634-640 are distributed within the sampling intervals 602-608. Similarly, in FIG. 7, the distribution of actual sampling times 726-732 are distributed within the allowed ranges 718-724 of the sampling intervals 702-708. In FIGS. 6 and 7, the distribution of the actual sampling times may be distributed within the respective periods according to any desired distribution, such as a uniform distribution, a normal distribution, chi square distribution, binomial distribution, Poisson distribution, etc. The random number generator may generate random numbers that are distributed uniformly or according to any desired distribution.

Accordingly, actual sample times may be distributed within sampling intervals or allowed ranges within sampling intervals according to a selected type of distribution. In the example of a normal distribution, the sample times would be concentrated in the middle of the sampling interval and/or allowed range of the sampling interval. In the example, the mean and the standard deviation of the normal distribution may be adjusted as desired to increase the sampling and/or fluid-flow measurement accuracy. The adjustment to the mean and/or standard deviation may be based on fluid flow rate, fluid flow rate variability, and/or other factors.

Example Devices and Meters

Figure 8:
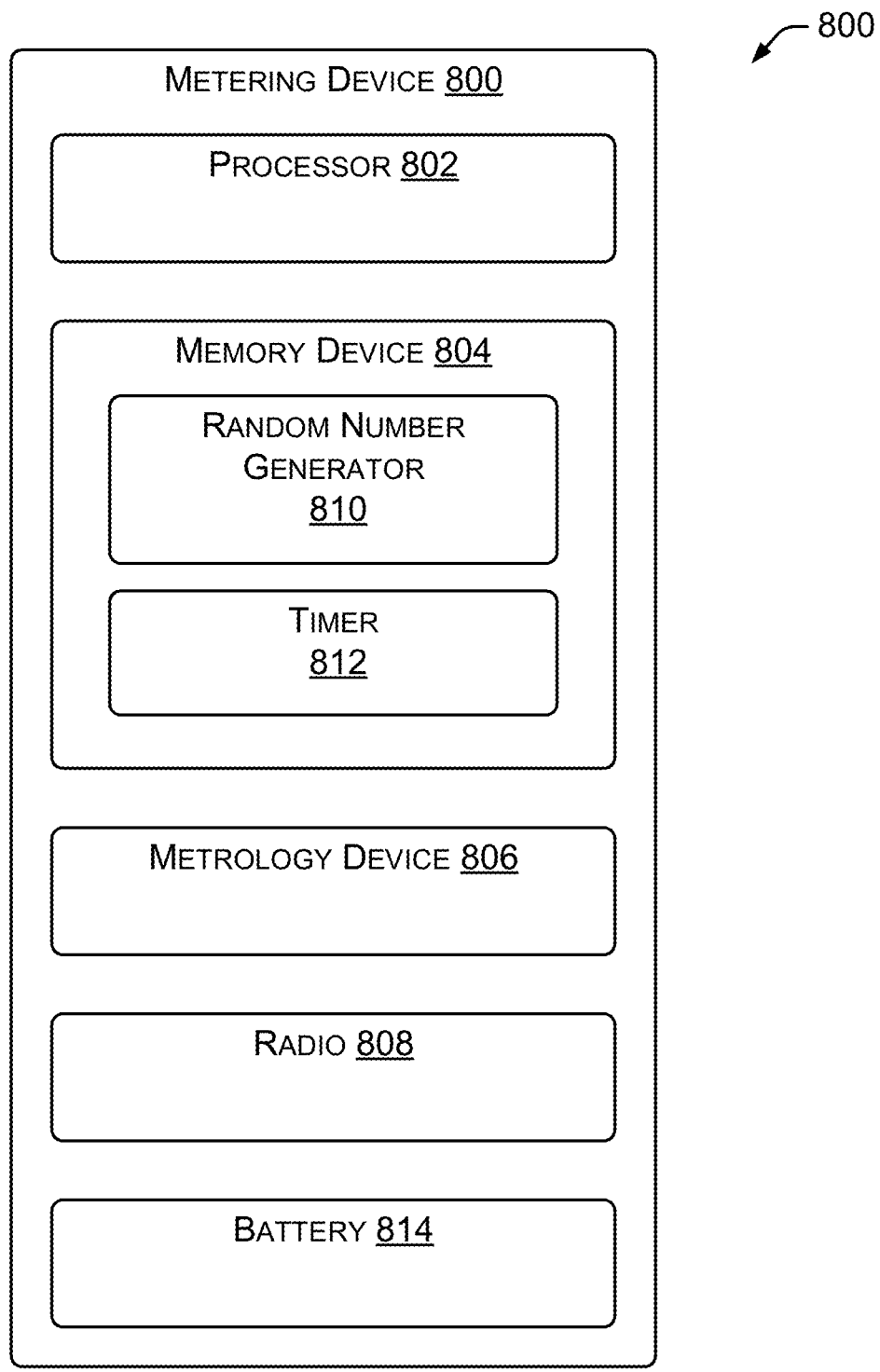
FIG. 8 is a diagram showing an example metering device that improves data collection accuracy and power requirements.

FIG. 8 shows an example metering device 800 configured to implement techniques described herein. A processor 802 is configured to obtain and execute program statements contained in a memory device 804. The processor 802 may communicate with, control and operate, and/or receive data from a metrology device 806. The metrology device 806 may be a static fluid meter or device based on electromagnetic and/or acoustic technology. The metrology device 806 may be within the metering device 800, or partly or fully within a fluid flow (e.g., a pipe). Data obtained from the metrology device 806 may be stored by operation of the processor 802 in the memory device 804. When a sufficient amount of data has been stored, the data may be sent to an upstream device by operation of a radio 808. The radio may also be communicated with, and/or controlled and operated by, the processor 802.

A random number generator 810 may be part of the processor 802, may be included within another device, or may be a separate device. In an example, the random number generator 810 is defined in software within the memory device 804 and executed by the processor 802. In example operation, the random number generator 810 may generate numbers from 0.0 to 1.0, typically exclusive of the end-point values (i.e., the end-point values of 0.0 and 1.0). The random numbers may be used at least in part to determine sampling times during which the metrology device 806 is operated. In an example, the random number generator 810 generates one random number for each sampling interval. A timer 812 may be set based at least in part on the generated one random number for each sampling interval.

The timer 812 may be part of the processor 802, may be included within another device, or may be a separate device. In an example, the timer 812 is software defined in the memory device 804 and executed by the processor 802. In example operation, the timer 812 may generate a period of time, which may have a duration based at least in part on output from the random number generator. In an example, output of the timer 812 may be used—directly or indirectly through the processor—to activate the metrology device 806 and to cause that device to sample fluid flow.

A battery 814 may be used to power the metering device 800, including the processor, memory device, metrology device, radio, etc. In an example, the metrology device 806 may be powered by the battery 814 in a randomly and/or uniformly distributed manner.

In the example of FIG. 6, the random number generator 810 may provide a value between 0.0 and 1.0 that may be used to indicate a percentage of the sampling interval 602 which elapses before a sample (i.e., a measurement of fluid flow) is taken at the sampling time 634. In the example of FIG. 7, the random number generator 810 may provide a value between 0.0 and 1.0 that may be used to indicate a percentage of the allowed range 718 (within the sampling interval 702) which elapses before a sample is taken at the actual sampling time 726.

Example Methods

In some examples of the techniques discussed herein, the methods of operation may be performed by the general-purpose processor 802 utilizing software defined in computer readable media or may be performed by one or more application specific integrated circuits (ASIC). In the examples and techniques discussed herein, the memory 804 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 9:
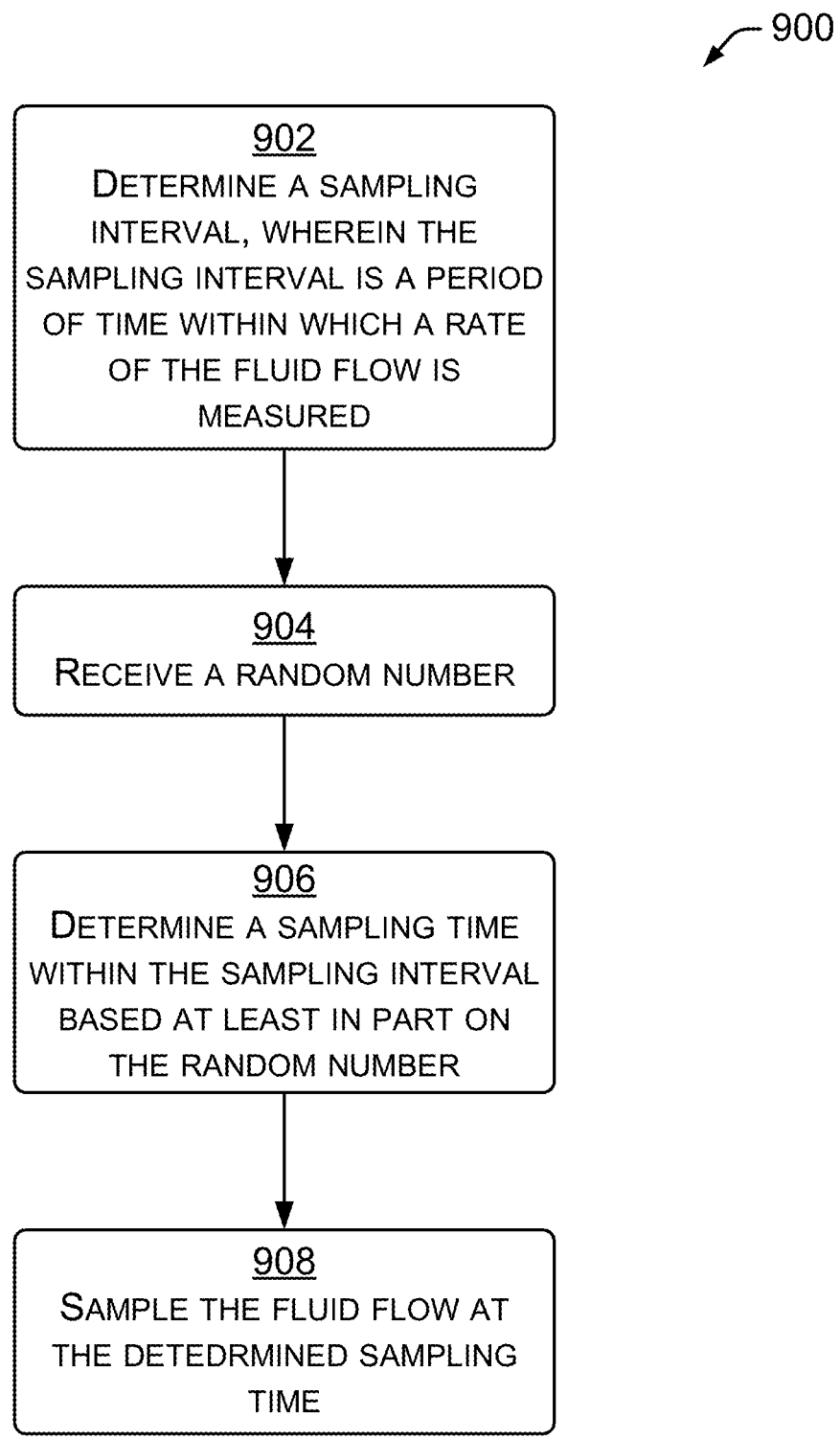
FIG. 9 is a flowchart showing example techniques by which a static fluid meter may be operated.

FIG. 9 shows example methods and/or techniques 900 by which a metering device may be operated. In versions of the example, a static fluid meter samples fluid flowrate in a repetitive manner. Each sample may be made within a respective sampling interval. Sampling intervals may be defined in a non-overlapping and gap-free manner with respect to time. In an example, one sample (i.e., fluid flow measurement) is taken at a random time within each sampling interval. Thus, random values between 0.0 and 1.0 may represent elapsed fractions of the sampling interval after which a sample is taken. That is, each random value may represent a fraction of a sampling interval that elapses before the fluid flowrate sample is taken. In a specific example, a random number 0.53 associated with a sampling interval may indicate that a sample is taken after 53% of the sampling interval has elapsed and 47% of the sampling interval remains. In such examples, a plurality of sampling times is offset from the beginnings of a respective plurality of sampling intervals. The offsets may be fractions or percentages, which may be uniformly distributed between 0.0 and 1.0. In such examples, the sample is taken at a randomly determined time at any location within the sampling interval. In other examples, the sample is taken at a randomly determined time within a subset of the sampling interval. In these examples, minimal (and/or maximal) spacing between sampling times may be enforced.

The timing of fluid flow sampling affects battery-power consumption, measurement accuracy, and the ability of a metrology unit in a metering device to accurately measure some fluid flows that have periodic changes. Accordingly, improved techniques to govern the timing of fluid flow sampling (such as by electromagnetic or ultrasonic techniques) result in better measurement accuracy, better power management and longer product life.

At block 902, a sampling interval is determined. The sampling interval may be a period of time within which one measurement is taken of a fluid flow rate. In example implementations, the number of sampling intervals and samples taken per unit of time (e.g., per hour, day or year) may be fixed. In a particular example implementation, each sampling interval may be one-second (or more, or less) in length, and the sampling intervals may be configured, end-to-end, sixty per minute, such as over a period of years. The time at which each sampling interval begins may be based on time-of-day or other reference, depending on design requirements.

In some implementations, varying a length (in time) of each sampling interval by a random number is a technique that may be used instead of, or in combination with, the techniques of FIGS. 4-7. By varying the length of the sampling interval, some of the benefits of the techniques described in FIGS. 4-7 may be achieved, while using different techniques. Accordingly, a length of a sampling interval may be determined at least in part by use of a random number. This will result in different spacing between actual sampling times and will result in results that are similar to those seen in FIGS. 4 and 5.

At block 904, a random number is received. In the example of FIG. 8, the random number is obtained from a random number generator 810, which may be software-defined and operable within processor 802 or may be a stand-alone device. The random number may be a number between 0.0 and 1.0 (typically exclusive of the end-points 0.0 and 1.0). Alternatively, the random number may be between −1.0 to +1.0, or other convenient range.

At block 906, a sampling time is determined within the sampling interval. In an example, the random number is used at least in part to determine a fraction of the sampling interval which elapses prior to the sampling time.

The determination of the sampling time within the sampling interval is made based at least in part on the random number. In the example of FIG. 6, a sample of the fluid flow is taken within the sampling interval 602. The random number of 0.12 (in the example) resulted in a sample time 634 that is 12% of the way into the sampling interval 602. In the example of FIG. 7, the sampling time is determined to be a random time within a subset (e.g., an allowed range of the sampling interval) of the sampling interval. As seen in FIG. 7, a sample of the fluid flow is taken within the sampling interval 702. The random number of 0.85 resulted in a sample time 726 that is 85% of the way into the allowed range 718. Accordingly, the sampling time is determined to be a random time within a portion 718 of the sampling interval 702, wherein the portion of the sampling interval is less than a sampling interval.

At block 908, a signal is sent to a metrology device. Responsive to the signal, the fluid flow is sampled at the determined sampling time. In the example of FIG. 8, the processor 802 may signal the metrology device 806, thereby initiating the sampling of fluid flow. In the example of FIG. 6, the sample times 634-640 are based on a random number that indicates a location within the sampling interval. Accordingly, an electromagnetic or acoustic sampling may be performed at the sample times 634-640. Thus, the metrology device 806 samples fluid flow responsive to a signal transmitted within each sampling interval of a plurality of sampling intervals 602-608. In many examples, the sampling times are uniformly distributed in time.

In the example of FIG. 7, the sample times 726-732 are based on a random number that indicates a location within allowed ranges 718-724 of the sampling intervals 702-708. Accordingly, an electromagnetic or acoustic sampling may be performed at the sample times 726-732. Where the allowed range of the sampling interval is 50% of the sampling range, the distance between any two sampling times is constrained to be less than 1.5 times the sampling interval. Where the allowed range of the sampling interval is 60%, the distance between any two sampling times is constrained to be less than 1.6 times the sampling interval. In some examples, the magnitude of the fluid flow and/or the variability of measured fluid flow and/or other factor(s) may be used to control the allowed range and/or "window" within the sampling interval within which the sampling time may be located.

FIG. 10 shows further example methods and/or techniques 1000 indicating how a sampling time within a sampling interval may be determined. In an example, a sampling time is determined within the sampling interval in a manner that is based at least in part on a random number. In example use of the random number, a percentage of the sampling interval which elapses before the sample fluid flow measurement is taken (e.g., the metrology device acts) is based on the random number (which may be a value between 0.0 and 1.0). Accordingly, the techniques 1000 provide additional techniques related to block 906 of FIG. 9.

In the example of block 1002, the sampling time may be determined by adding or subtracting time from a starting time of the sampling interval, an ending time of the sampling interval, or an intermediate point of the sampling interval. The added or subtracted time may be based at least in part on the received random number. In the example of FIG. 6, time shifts 618-624 are added or subtracted from the middle point of a respective sampling interval 602-608 to result in the sampling times 634-640.

In the example of block 1004, the sampling times are determined at locations of respective plurality of sampling intervals so that the sampling times are uniformly distributed. For example, numbers representing, and/or that are proportional to, times from the start of each of a plurality of sampling intervals are uniformly distributed.

In the example of block 1006, the sampling time is determined within a portion of the sampling interval. The portion of the sampling interval may be less than the sampling interval. FIG. 7 shows an example of allowed ranges 718-724 which are defined within respective sampling intervals 702-708. In the example of block 1008, a size of the portion of the sampling interval may be set based at least in part on at least one of a magnitude of measured fluid flow and/or a variability of measured fluid flow.

Figure 11:
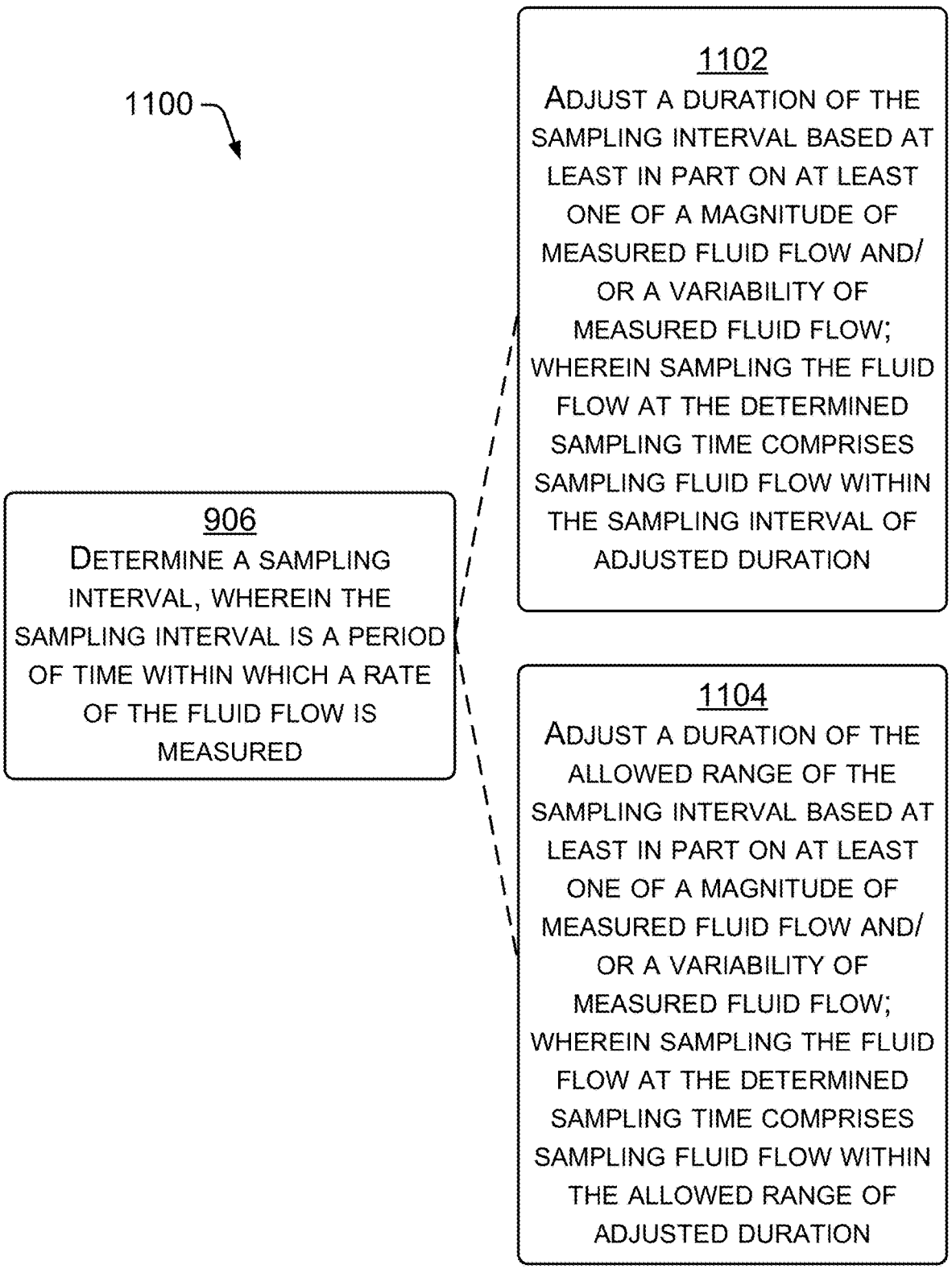
FIG. 11 is a flowchart showing further example techniques by which a sampling time may be determined.

FIG. 11 shows further example methods and/or techniques 1100 indicating how a sampling time is determined. In an example, a sampling time is determined within the sampling interval in a manner that is based at least in part on the random number. Accordingly, the techniques 1100 provide additional techniques related to block 906 of FIG. 9.

In the example of block 1102, a duration of the sampling interval may be adjusted. In one example, the adjustment may be based at least in part on at least one of a magnitude of measured fluid flow and/or a variability of measured fluid flow. In a further example, sampling the fluid flow at the determined sampling time (e.g., as described at block 908 of FIG. 9) may include sampling fluid flow within the sampling interval of adjusted duration. Thus in one example, one or more sampling interval (e.g., intervals 602-608 and/or intervals 702-708 of FIGS. 6 and 7, respectively) may be adjusted to longer and shorter durations. This may have the effect of "bunching up" and "spreading out" the actual sample times. If the sampling interval is shortened for a period of time, then the sampling times are "bunched up" during that period of time. If the sampling interval is lengthened for a period of time, then the sampling times are "spread out" during that period of time. Either of these conditions and/or switching between them may result in detected fluid flow that would otherwise not be detected; i.e., block 1102 presents a solution to the problem expressed in FIGS. 2 and 3 that is an alternative and/or an addition to the solution(s) expressed in FIGS. 4-7.

In the example of block 1104, a duration of the allowed range of the sampling interval is adjusted. In one example, the adjustment may be based at least in part on at least one of a magnitude of measured fluid flow and/or a variability of measured fluid flow. In a further example, sampling the fluid flow at the determined sampling time (e.g., as described at block 908 of FIG. 9) may include sampling fluid flow within an allowed range (or time period) of adjusted duration. Thus in one example, the allowed ranges (e.g., ranges 718-724 of FIG. 7) may be adjusted to longer and shorter durations. This has the effect of "bunching up" and "spreading out" the actual sample times. If the allowed range is shortened for a period of time, then the sampling times are "bunched up" during that period of time. If the allowed range is lengthened for a period of time, then the sampling times are "spread out" during that period of time. Either of these conditions and/or switching between them may result in detected fluid flow that would otherwise not be detected; i.e., block 1104 presents a solution to the problem expressed in FIGS. 2 and 3 that is an alternative and/or an addition to the solution(s) expressed in FIGS. 4-7.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method of measuring a fluid flow, comprising:
   determining a sampling interval, wherein the sampling interval is a period of time within which a rate of the fluid flow is measured;
   receiving a random number;
   determining a sampling time within the sampling interval based at least in part on the random number, wherein sampling times are distributed according to a normal distribution;
   adjusting a mean and a standard deviation of the normal distribution based at least in part on:
     fluid flowrate; or
     fluid flowrate variability; and
   sampling the fluid flow at the determined sampling time.

2. The method of claim 1, wherein the random number is used at least in part to determine a fraction of the sampling interval which elapses prior to the sampling time.

3. The method of claim 1, wherein determining the sampling time within the sampling interval comprises:
   determining the sampling time by adding or subtracting time from a starting time of the sampling interval, an ending time of the sampling interval, or an intermediate point of the sampling interval.

4. The method of claim 1, wherein determining the sampling time within the sampling interval comprises:
   determining the sampling time within an allowed range within the sampling interval, wherein the allowed range is of a duration less than a duration of the sampling interval.

5. The method of claim 4, wherein a size of the allowed range of the sampling interval is set based at least in part on at least one of a magnitude of the measured rate of fluid flow and/or a variability of the fluid flow.

6. The method of claim 1, additionally comprising:
   adjusting a duration of the sampling interval based at least in part on at least one of a magnitude of measured fluid flow and/or a variability of measured fluid flow;
   wherein sampling the fluid flow at the determined sampling time comprises sampling fluid flow within the sampling interval of adjusted duration.

7. The method of claim 1, additionally comprising:
   adjusting a duration of an allowed range of the sampling interval based at least in part on at least one of a magnitude of measured fluid flow and/or a variability of measured fluid flow;
   wherein sampling the fluid flow at the determined sampling time comprises sampling fluid flow within the allowed range of adjusted duration.

8. The method of claim 1, wherein measuring the fluid flow comprises measuring a flow of water or natural gas.

9. The method of claim 1, wherein the mean and the standard deviation of the normal distribution are adjusted based at least in part on fluid flowrate.

10. The method of claim 1, wherein the mean and the standard deviation of the normal distribution are adjusted based at least in part on fluid flowrate variability.

11. A metering device, comprising:
    a metrology device configured to measure a fluid flow;
    a timer;
    a random number generator;
    a processor, configured to perform actions comprising:
      determining a sampling interval, wherein the sampling interval is a period of time within which a rate of the fluid flow is measured, and wherein sampling times are distributed according to a normal distribution;
      adjusting a mean and a standard deviation of the normal distribution based at least in part on:
        fluid flowrate; or
        fluid flowrate variability;
      receiving a random number from the random number generator;
      determining a sampling time within the sampling interval based at least in part on the random number and the normal distribution;
      setting the timer based at least in part on the determined sampling time;
      sending a signal to the metrology device to sample the fluid flow at a time indicated by the timer; and
      sampling the fluid flow with the metrology device responsive to the signal.

12. The metering device of claim 11, wherein at least one of the timer and the random number generator is defined in software executed by the processor.

13. The metering device of claim 11, additionally comprising:
    a battery to power at least the metrology device;
    wherein the battery powers the metrology device to sample the fluid flow in a normally distributed manner.

14. The metering device of claim 11, wherein determining the sampling time within the sampling interval comprises:
  determining the sampling time by adding or subtracting time from:
    a starting time of the sampling interval;
    an ending time of the sampling interval; or
    a point within the sampling interval;
  wherein the added or subtracted time is based at least in part on the random number.

15. The metering device of claim 11, wherein the metrology device samples fluid flow responsive to a signal transmitted within each sampling interval of a plurality of sampling intervals, and wherein a plurality of determined sampling times of the plurality of sampling intervals are uniformly distributed.

16. The metering device of claim 11, wherein:
  the random number generator generates one random number for each sampling interval; and
  the timer is set based at least in part on the generated one random number for each sampling interval.

17. The metering device of claim 11, wherein the processor is additionally configured to perform actions comprising:
  adjusting the mean and the standard deviation of the normal distribution based at least in part on fluid flowrate.

18. The metering device of claim 11, wherein the processor is additionally configured to perform actions comprising:
  adjusting the mean and the standard deviation of the normal distribution based at least in part on fluid flowrate variability.

19. One or more computer-readable media storing computer-executable instructions that, when executed by one or more processors, configure a computing device to perform acts comprising:
  determining a sampling interval, wherein a rate of a fluid flow is measured once per sampling interval, wherein sampling times are distributed according to a normal distribution;
  adjusting a mean and a standard deviation of the normal distribution based at least in part on:
  fluid flowrate; or
  fluid flowrate variability;
  receiving a random number;
  determining a sampling time within the sampling interval based at least in part on the random number and the normal distribution; and
  sampling the fluid flow at the determined sampling time.

20. The one or more computer-readable media of claim 19, wherein sampling the fluid flow comprises sampling a flow of water or sampling a flow of natural gas.

21. The one or more computer-readable media of claim 19, wherein determining the sampling time comprises:
  determining the sampling time within a defined subset of the sampling interval.

22. The one or more computer-readable media of claim 19, wherein the mean and the standard deviation of the normal distribution are adjusted based at least in part on fluid flowrate.

23. The one or more computer-readable media of claim 19, wherein the mean and the standard deviation of the normal distribution are adjusted based at least in part on fluid flowrate variability.

* * * * *